United States Patent Office 3,268,020
Patented August 23, 1966

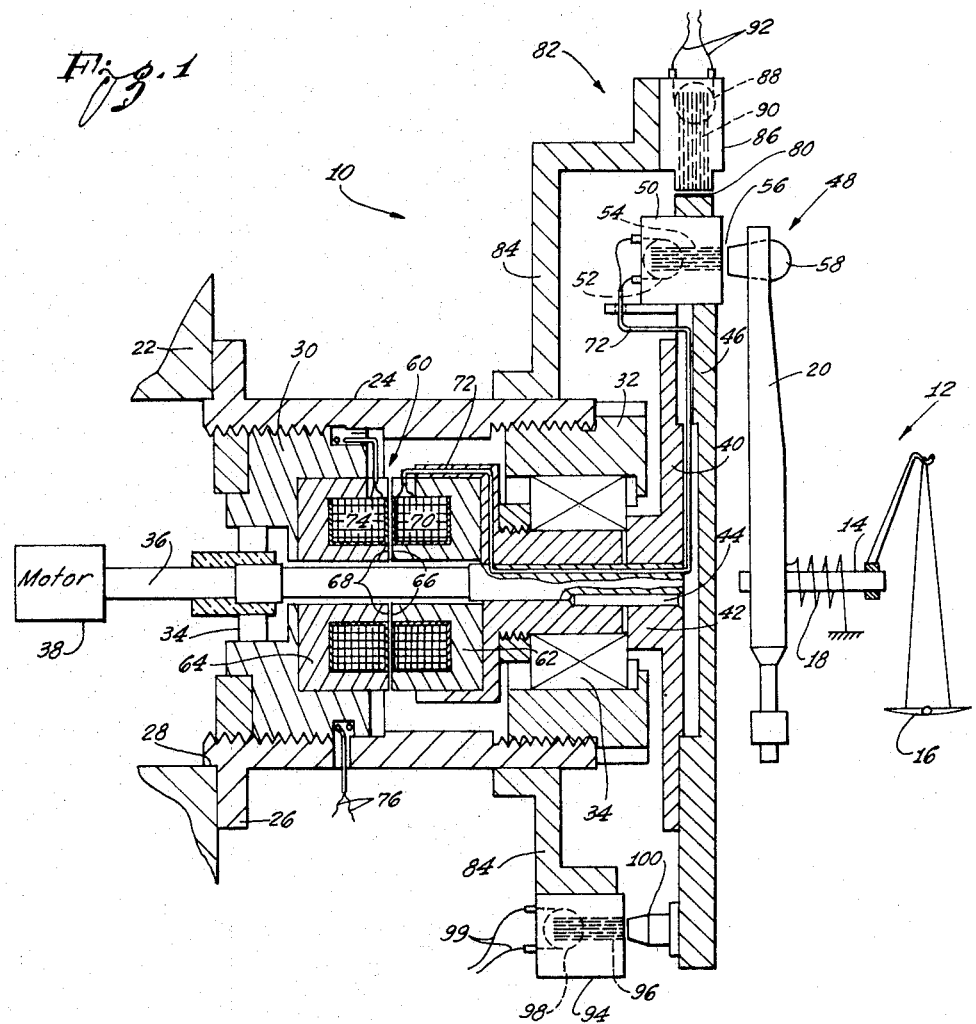

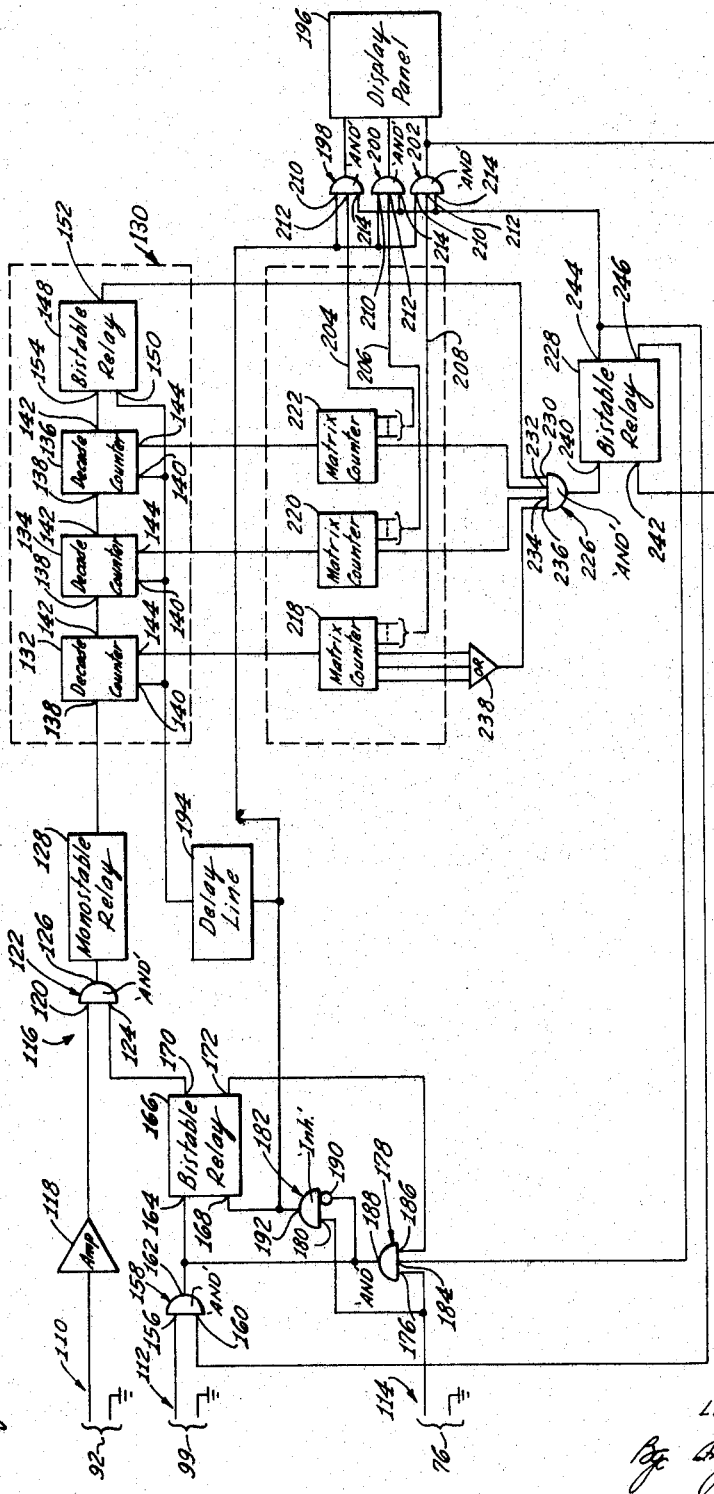

3,268,020
NUMERICAL INDICATOR
Lucien P. Puechberty, Paris, France, assignor to Biagio F. Ambrosio, doing business as B.F.A. Products Co., Tarzana, Calif.
Filed Sept. 9, 1963, Ser. No. 307,743
24 Claims. (Cl. 177—210)

The present invention relates to numerical indicator means, and more particularly to means for measuring the weight of an object and providing an electrical signal representing an object's weight. This is a continuation-in-part of copending application Serial No. 303,355 filed in the name of Lucien P. Puechberty entitled Numerical Indicator and filed August 20, 1963, now abandoned.

It is very frequently desirable to be able to measure the weight of an object and to provide an electrical signal which represents the weight of the object. One numerical indicator for accomplishing this is disclosed in French Patent No. 1,280,012 filed November 15, 1960, in the name of the present claimant. In this indicator, a disc is interconnected directly with a scale or balance whereby the disc will rotate about its axis through an arc corresponding to the weight of the object. A series of graduated marks are spaced circumferentially around the disc at intervals that represent predetermined increments of weight. Suitable photoelectric means are provided adjacent the disc so as to sense the passage of the graduations when the disc is being rotated by an object to be weighed. The photocell will then produce a pulse each time that the disc rotates by an increment equal to the spacing of one graduation. As a result, the total number of pulses from the photocell will indicate the amount of angular rotation of the disc and therefore will represent the total weight of the object.

Although a numerical indicator of the foregoing description can accurately measure the weight of an object and provide electrical signals representing the weight, it is necessary for the marks on the scale to be very precisely positioned. Also, the optical reader or optical system for sensing the movement of the graduations must have a high separating or resolving power that will accurately and reliably detect the passage of each of the closely spaced graduations.

Furthermore, there is normally a substantial amount of inertia in the weighing system and in the indicator. As a consequence, if the system is not critically damped or overdamped, the graduated disc will overshoot or rotate too far and oscillate back and forth until it comes to rest in a stabilized position which is an accurate indication of the weight of the object. During the overshooting and oscillating movements of the disc, the graduations will move past the photocell and produce counting pulses in excess of weight of the object. To prevent such an error, the counter for recording the number of pulses must be capable of subtracting the pulses when the disc has overshot and is returning to the stable position. Although such an arrangement is practical, it has been found that the cost of such a system is very high.

It is now proposed to provide a weight measuring means which will be effective to overcome the foregoing difficulties. More particularly, it is proposed to provide weight measuring means which are simple in construction and reliable in operation. In one operative embodiment of the invention, this is accomplished by providing a signal generating portion having a series of graduations on a rotating disc that will produce a series of electrical counting pulses as the disc rotates. The rotating disc is disposed adjacent an indicator that is deflected through an angular arc proportional to the weight of the object. Gating means are provided that are responsive to the position of the indicator when it is deflected through an angle proportional to the weight of the object and will produce a pair of timing pulses separated by an interval that is proportional to the weight of the object. A computer portion is provided that will count the counting pulses during the interval between the timing pulses only when the indicator is stabilized. As a consequence, a reliable weight signal will be provided.

These and other features and advantages of the present invention will become readily apparent from the following detailed description of one embodiment thereof, particularly when taken in connection with the drawings wherein like reference numerals refer to like parts, and wherein:

FIGURE 1 is a longitudinal cross-sectional view of the signal generating portion of a weight indicating means embodying one operative form of the present invention; and FIGURE 2 is a block diagram of the computer portion of the weight indicating means for processing the signal from the signal generating portion of FIGURE 1.

Referring to the drawing in more detail, the present invention is particularly adapted to be embodied in weighing means for measuring the weight of an object and providing a suitable indication of the weight. More particularly, the weighing means includes a signal generating portion 10 that produces a series of weight signals and a computer portion (shown in FIGURE 2) that receives the weight signals and produces an indication of the weight.

The present signal generating portion 10 is adapted to be employed with a scale or balance 12 which may be of any desired design. The present scale 12 includes a pan or tray 16 for receiving the object to be weighed. The tray 16 is connected to a rotatably mounted shaft 14 so as to create a torque on the shaft 14 that is a function of the weight of the object. A spring 18 or similar means may be connected to the shaft 14 so as to apply a counter or balance torque to the shaft 14. This will cause the shaft 14 to be angularly deflected through an arc proportional to the weight of the object.

A pointer or indicator needle 20 is secured to the end of the shaft 14 so as to rotate therewith. As a consequence, when an object to be weighed is placed on the tray 16, the shaft 14 will rotate through an arc proportional to the weight. This will carry the indicator needle 20 through the same arc whereby the angular position of the indicator needle 20 will be effective to indicate the weight of the object which is positioned on the pan 16.

The numerical signal generating portion 10 is effective to sense the position of the indicator needle 20 and provide a series of signals that are a function of the position of the needle 20. The portion 10 is disposed immediately adjacent to the indicator needle 20 but slightly spaced therefrom so that the position of the needle 20 can be sensed without any physical contact.

The present portion 10 includes a stationary base or stand 22 that supports the operative elements of the portion 10. This stand 22 may be secured to or from an integral part of the scale 12. This will insure the portion 10 being maintained precisely positioned in relation to the scale 12. A suitable housing 24 for enclosing and supporting the operative elements may be rigidly secured to the stand 22. This housing 24 is a substantially cylindrical member having a flange 26 extending circumferentially therearound adjacent one end. This end fits into an opening 28 in the base stand as to project outwardly from the stand 22 and thereby support the portion 10 adjacent to the needle 20 and in substantial alignment with the shaft 14.

A pair of annular supports or rings 30 and 32 are secured to the inside of the housing adjacent its opposite ends. Suitable bearings such as roller bearings 34 may be secured to each of the support rings 30 and 32 so as to be substantially concentric with the opening 28 in the stand 22 and the housing 24. A rotating structure may be mounted on these bearings 34 so as to rotate within the cylindrical housing 24.

The rotating structure includes a spindle or shaft 36 that is rotatably carried by the bearings 34 and, in turn, carries a disc 40. The inner end of the shaft 36 projects from the inner bearing 34 into the interior of the stand 22. This end of the shaft 36 may be connected with a suitable drive such as a synchronous motor 38. This motor 38 will be effective to drive the shaft 36 at a substantially constant speed. However, as will become apparent, variations in the speed of the motor 38 will not adversely affect the operation of the weighing means of FIGURE 1.

The disc 40 may have a hub 42 in the center thereof that is rigidly secured to the end of the shaft 36 by a key 44 or similar device. This will insure the disc 40 always rotating with the shaft 36. A second disc 46 may be secured to the first disc 40 so as to also rotate therewith.

The base stand 22 and bearing 34 are all arranged so that the rotating shaft 36 will be substantially coaxial with the shaft 14 and the disc 46 will rotate in a plane that is close to and substantially parallel with the plane in which the indicator needle 20 swings. It may thus be seen that whenever an object is placed on the pan 16, the indicator needle 20 will swing across the face of the disc 46.

In order to sense the position of the indicator needle 20, a suitable weight or indicator pickup means 48 may be provided on the disc 46. This pickup 48 is responsive to the passage of the needle 20 and produces a weight or indicator signal each time that the discs 46 rotates past the needle 20. Since this signal will occur at the instant that the pickup means 48 passes the end of the needle 20, the phase or time occurrance of the signal will be a function of the weight of the object. In the present instance, the pickup means 48 includes a reading head 50 secured to the disc 46 adjacent its periphery. This head 50 rotates in a circle that is adjacent the outer end of the needle 20.

Although the reading head 50 may be of any desired variety, in the present instance, it is a so-called magnetic reading head. This head 50 includes an inductive coil 52 that is wound upon a magnetic core 54 having an air gap 56 therein. A magnetic member 58 is secured to the end of the indicator needle 20 so that each time the disc 46 rotates, the member 58 will pass through the air gap 56 and affect the inductance of the coil 52. In addition, as in the present instance, the member 58 is permanently magnetized to increase the strength of the signal. Thus, each time that the disc 46 rotates through one revolution, the magnetic core 54 and the coil 52 in the head 50 will pass through the flux field maintained by the permanent magnet 58. As the lines of flux cut across the coil 52, they will be effective to generate weight or indicator signals that will be in the form or a short pulse.

In order to couple this electrical signal out of the moving reading head 50, suitable slip rings and brushes may be provided on the disc 46 or the shaft 36. However, in the present instance, a transformer 60 is provided concentrically about the shaft 36. The transformer 60 includes a magnetic core that has a primary section 62 and a secondary section 64. The primary section 62 is secured to the shaft 36 so as to rotate therewith. This section 62 includes a pair of faces 66 that are disposed concentrically about the shaft 36.

The secondary section 64 is secured to the ring 30 attached to the inside of the cylindrical housing 24. This section 64 may be substantially identical to the first section 62. It also includes a pair of annular faces 68 that are concentric with the shaft 36. The two sets of faces 66 and 68 are disposed substantially coaxial with each other and are separated by an air gap. This air gap may be of only sufficient size to permit the primary section 62 to rotate with the shaft 36 without producing any wearing or physical drag on the rotating structure.

A primary coil or winding 70 is provided on the primary section 62 of the core so that a current circulating in the winding 70 will generate a flux field that will emerge from the faces 66. The opposite ends of this winding 70 are connected to the opposite ends of the coil 52 in the reading head 50 by a pair of electrical leads 72 that extend across the back of the disc 46. It may thus be seen that whenever the reading head 50 passes the magnet 58, a pulse will circulate in the primary winding 70.

A secondary coil or winding 74 is provided on the secondary section 64 of the core. When the weight signal in the primary winding 70 produces a flux field in the primary winding 70, the flux will flow across the air gap and into the secondary section 64 of the core. A corresponding signal will then be induced into the secondary winding 74. The opposite ends of the secondary 74 may be interconnected with one of the inputs 114 to the computer portion 11.

As a consequence, each time that the reading head 50 passes through the flux field created by permanent magnet 58 on the end of the indicator needle 20, a weight or indicator signal will be produced in the pickup head 50. This signal will circulate in the primary winding 70 and produce a corresponding signal in the secondary winding 74. The signal induced in the secondary winding 74 will then flow over the electrical leads 76 to the input 114 of the computer portion 11. As previously pointed out, the time at which this signal occurs will be a function of the angular position of the needle 20 and also the weight of the object on the pan 16.

A series of graduations 80 may be provided on the periphery of the disc 46. A suitable pickup means 82 for sensing the movement of the graduations 80 may be provided on a support 84 extending from the top of the housing 24. This pickup 82 will be effective to produce counting signal or a pulse each time one of the graduations 80 moves past the pickup. The graduations 80 are positioned at substantially uniformly spaced intervals that correspond to a fixed increment of weight. Although these graduations 80 may be of any desired variety, in the present instance they comprise a series of magnetic members or strips. These strips are attached to or embedded in a non-magnetic material such as a plastic.

In the present instance, since the graduations 80 are of a magnetic variety, the pickup means 82 includes a magnetic reading head 86 having a coil 88 wound upon a magnetically permeable core 90. The core 90 includes an air gap that is positioned immediately adjacent to the periphery of the disc 46 so that the magnetic graduations 80 will pass through the air gap.

It may thus be seen that each time one of the magnetic graduations 80 passes through the air gap in the pickup head 86, it will produce a counting signal. Since the graduations 80 are uniformly spaced on the periphery, the signals will represent equal increments of rotation. The total number of graduations 80 may be any desired amount. However, by way of example, the periphery of the disc 46 may have 1087 graduations 80 and a segment of 10 or 15 where there are no graduations 80.

The opposite ends of the coil 88 in the read head 86 are interconnected with a pair of electrical leads 92 that extend to an input 110 of the computer portion 11.

In order to provide a signal which may be used as a reference to indicate when the disc 46 places through a zero or reference position, a suitable reference head 94 may be provided. Although this reference head 94 may be of any desired variety, in the present instance it is similar to the preceding reading heads 50 on the disc 46. More particularly, the reference head 94 includes a core 96 of magnetically permeable material having an air gap. A coil 98 is wound upon this core 96 so as to be inductively coupled thereto. The head 94 may be mounted by any suitable means such as a downwardly extending portion of the support 84. The reference head 94 will thus be disposed substantially diametrically opposite from the counting head 86.

A member 100 may be secured to the disc 46 at some predetermined reference point so as to excite the head 94 each time the disc 46 passes through a predetermined zero or reference position. In the present instance, this member 100 is a permanent magnet that is secured to the disc adjacent its periphery so as to pass through the air gap in the core 96. The permanent magnet 100 may be secured to the disc 46 in a position such that the magnet 100 will pass the head 94 at or just prior to the time that the graduations 80 will commence passing under the pickup 82.

The opposite ends of the coil 98 are connected to a pair of electrical leads 99. The opposite ends of the leads 99 may be connected to an input 112 to the computer portion 11. The computer 11 includes three separate inputs 110, 112 and 114 which are interconnected with the conductors 92 from the reading head 82 so as to receive the counting signals therefrom, with the conductors 99 from the reference head 94 to receive the reference or zero signal and with the conductors 76 from the indicator head 50 for receiving the weight or indicator signals corresponding to the weight of the object on the pan 16.

The first input 110 which is connected to the coil 88 in the reading head 86 leads to a counting branch 116 that is responsive to the counting signals or pulses. This branch 116 includes an amplifier 118 that is effective to increase the amplitude of the counting pulses to a more useful amplitude and thereby maintain a high signal-to-noise ratio on the trains of counting pulses.

The output of the pulse amplifier 118 is connected directly to one of the control inputs 120 of an AND gate 122. The present AND gate 122 which may be of a conventional variety, includes two separate control inputs 120 and 124 and a single output 126. These are arranged so that a signal will appear on the output 126 only when there are signals simultaneously present on both of the control inputs 120 and 124.

The output 126 of the AND gate 122 may be interconnected directly with a suitable pulse-shaping network that will insure each of the counting pulses having standard amplitudes and time durations. By way of example, the pulse-shaping network may be a monostable circuit or relay 128 such as a one-shot multivibrator. When a signal is applied to the input of such a network, it will switch to an unstable state so as to provide a signal at its output. This signal will have a fixed amplitude and a duration that is determined solely by the components in the network. At the end of this period, the signal at the output returns to the stable level. Thus, the output will be at-squarewave pulse having a fixed ampliude and fixed time duration.

The output of the pulse-shaping network or monostable relay 128 is interconnected with input to a counter 130 so as to feed the shaped counting pulses thereto. This counter 130 may be of any conventional design capable of accumulating a total count of the pulses as they occur. In thte present instance, the counter 130 includes three separate subcounters 132, 134 and 136. By way of example, in the present instance, each of the counters 132, 134 and 136 includes a pair of inputs 138 and 140 and a pair of outputs 142 and 144. The first input 138 to the first counter 132 is connected directly to the output of the pulse-shaper 128 so that it will receive all of the counting pulses. The first output 142 of the counter 132 is interconnected with the first input 138 to the second counter 134 while the first output 142 of the second counter 134 is interconnected with the first input 138 of the third counter 136. It may thus be seen that all of the counters 132, 134 and 136 are cascaded and will be effective to transfer counts from one counter to the successive counters.

If the counters are of the decade type, i.e., count from 0 to 9, the first decade counter 132 will be effective to count units, the second decade counter 134 will count 10's and the third decade counter 136 will count 100's. More particularly, each time the first decade counter 132 reaches a count of 10, it will transfer a count from its output 142 to the input 138 of the second decade counter 134 whereby the second decade counter 136 will be counting by 10's up to 100. Each time the second decade counter 134 has accumulated a count of ten 10's or 100, it will transfer a count from its output 142 to the input 138 of the third decade counter 136. The third decade counter 136 will then be counting by 100's up to 1,000. When the decade counters 132, 134 and 136 have counted to 1,000, a pulse will be provided at the output 142 of the third counter. A bistable relay 148 such as a so-called flip-flop may be provided in the counter 130. This relay 148 is effective to remain in either state indefinitely. However, when a pulse is applied to the input 154 of the relay 148, there will be no signals on the output 152, but when a pulse is applied to the input 154 there will be a signal on the output 152. The input 154 is connected to the output 152 of the third decade counter 142. As a consequence, each time the number of pulses fed to the counter 130 exceeds the capacity of decade counters 132, 134 and 136, a pulse will be fed to the input 154 of the relay 148 so as to cause a signal to be present on the output 152.

Each of the individual counters 132 to 136 will be effective to accumulate a total count of the pulses fed thereto and to retain the accumulated count for an extended period of time. The second inputs 140 to the counters 132 to 136 will be effective to cause the decade counters to be cleared each time that a re-set pulse is applied thereto. By interconnecting all of the second inputs 140 and the input 150 to the relay together, the count accumulated in the counter 130 will be equal to the total number of counting pulses which have occurred since the counters were all re-set to zero by the application of the re-set pulses to the second inputs.

If as previously suggested there are 1087 graduations 80 on the disc 46 and if all of the graduations 80 are counted, the relay 148 will be set to provide a signal on the output 152, the counter 136 will be set at 0, the counter 134 will be set at 8, and the counter 132 will be set at 7.

The second input 112 is connected to the conductors 99 leading to the coil 98 in the reference head 94 so as to receive the reference or zero pulses. The input 112 is also connected to one side 156 of a conventional AND gate 158. This AND gate 158 includes a pair of inputs 156 and 160 and a single output 162. Although this gate 158 may receive two separate and independent signals on the two inputs 156 and 160, a signal will occur on the output 162 only when both of the input signals occur simultaneously on both inputs 156 and 160.

The output 162 of the gate 158 is interconnected with one of the inputs 164 to a bistable relay 166. This relay 166 may be of any conventional design and more particularly may be a so-called flip-flop. The present relay 166 includes two separate inputs 164 and 168 and two separate outputs 170 and 172. When a signal is fed to the first input 164, no signal will be present on the second output 172 but a signal will be present on the first output 170. Similarly, when a signal is fed to the second input 166, no signal will be present on the first output 170, but a signal will be present on the second output 172.

The first output 170 of the relay 166 is connected to the second input 124 to the AND gate 122. It may thus be seen that each time a zero or reference pulse occurs, if the AND gate 158 is open, the pulse will switch the relay 166 so as to produce a signal on the first output 170. This signal, in turn, will flow to the second input 124 and be effective to open the gate 122 whereby any of the counting pulses on the input 120 may pass through the gate 122 and on to the counters 132, 134 and 136.

The third input 114 is connected to the conductors 76 leading to the coil 52 in the indicator 50 so as to receive the indicator or weight pulses. The input 114 is connected to one of the inputs 176 to a conventional AND gate 178 and with one of the inputs 180 to a conventional inhibit gate 182. The AND gate 178 includes three separate inputs 176, 184 and 186 and a single output 188 that are all arranged so that a signal will occur at the output 188 only when a signal is present on each of the three inputs 176, 184 and 186.

The inhibit gate 182 includes two separate inputs 180 and 190 and a single output 192. In the absence of an inhibiting signal on the second input 190, any signals that occur at the first input 180 will pass through the gate 182 to the output 192. However, if an inhibit signal is present at the second input 190, any signals that may occur at the first input 180 will be blocked from passing through the gate 182 and will not appear at the output 192.

The output 188 from the AND gate 178 is connected directly to the first input 164 of the bistable relay 166. Thus, a signal from the AND gate 178 will cause the relay 166 to switch to the condition where a signal will appear at the first output 170 and thereby open the AND gate 122.

The output 188 from the AND gate 178 is also connected to the inhibit input 190 to the gate 182. Thus, a signal from the AND gate 178 will be effective to block the gate 182 and prevent any pulses at the input 180 passing through the gate 182.

The output 192 of the inhibit gate 182 is connected to, among other things, the second input 168 of the bistable relay 166. As a consequence, if the inhibit gate 182 is open, the weight or indicator pulse will be effective to switch the bistable relay 166 to the condition where there is a signal on the second output 172 but no signal at the first output 170 whereby the AND gate 122 will be closed.

In addition, the output 192 of the inhibit gate 182 may be interconnected with the second inputs 140 on each of the decade counters 132, 134 and 136 and the input 150 of relay 148. Thus, each time a weight or indicator pulse is fed through the inhibit gate 182, the decade counters 132, 134 and 136 as well as relay 148 will be cleared so as to return to zero. As will become apparent subsequently, it has been found desirable to provide a delay line 194 in the interconnection between the inhibit gate 182 and the second inputs 140. This will be effective to delay the clearing of the decade counters 132, 134 and 136 from the occurrence of the indicator or weight pulse by some predetermined fixed but relatively short interval.

The outputs 144 of the decade counters may be interconnected with a suitable readout means that is capable of utilizing the various signals in decade counters. Although this readout means may be of any desired variety, in the present instance it includes a display panel 196. This panel 196 may include a plurality of numerical indicia corresponding to units, tens, and hundreds so as to represent the weights of the objects to be placed on the scale pan 16. Matrices 218, 220 and 222 are interconnected with the outputs 144 of the counters 132, 134 and 136. The matrices 218, 220 and 222 include a separate output conductor for each of the digits 0 through 9, inclusive. The conductors from each matrix may be joined into cables 204, 206 and 208. Each of the matrices 218, 220 and 222 will thus be able to energize one conductor in its cable corresponding to the digit stored in its respective counter.

In order to control the transfer of the count from the matrices and along the cables 204, 206 and 208 to the display panel 196, a separate AND gate 198, 200 and 202 may be disposed in each of the cables 204, 206 and 208 leading to the means in the display panel 196 for controlling the indicia.

The AND gates may be of a conventional design with each gate including three separate inputs 210, 212 and 214 and a single output. One of the control inputs 212 in each gate is interconnected with the cables 204, 206 and 208 so as to permit the accumulated counts to pass therethrough. A second input 210 to each of the gates 198, 200 and 202 may be interconnected with the output 192 of the inhibit gate 182. As a result, each time an indicator or weight pulse passes through the inhibit gate 182 thereby indicating that a total count has been accumulated, the gates 198, 200 and 202 will open and permit the count to be passed to the display panel 196 whereby the indicia will be energized in the required manner. The delay line 194 will be effective to insure that the count will be transferred from the decade counters 132, 134 and 136 to the panel 196 before the counters are cleared.

It may be seen that the portion of the computer 11 of FIGURE 2 described so far will be effective to indicate the weight present on the pan 16 in the form of a visual display on the display panel 1996. More particularly, when the disc 46 rotates through the zero position, the member 100 will move past the reference head 94 and produce a reference or zero signal at the input 156 to the AND gate 158. If this gate 158 is open, the pulse will be fed to the first input 164 of the bistable relay 166 whereby the relay 166 will be switched to a state wherein a signal will be present on the first output 170 of the relay 166 so as to open the AND gate 122. The counting pulses may thus be fed to the decade counters 132, 134 and 136 whereby a count of the pulses will be accumulated as they occur.

When the reference head 50 moves past the magnet 58 on the needle 20, an indicator or weight pulse will be produced. If the AND gate 178 and the inhibit gate 182 are open, this pulse will be fed to the bistable relay 166 whereby the relay 166 will be switched to the second state. This will remove the signal present on the first output 170 and close the AND gate 122. Thus, the counters 132, 134 and 136 will no longer accumulate a count. In addition, the weight or indicator pulse will be applied to the inputs 210 of the AND gates 198, 200 and 202 so that the accumulated counts in the counters 132, 134, and 136 will be transferred through the matrices 218, 220 and 222 and over the cables 204, 206 and 208 to the display panel 196 so as to energize the appropriate indicia therein. Following this, the weight or indicator pulse will have passed through the delay line 194 to the second inputs 140 of the various counters 132, 134 and 136 as well as relay 148 whereby they will be cleared and returned to zero ready for a subsequent count.

Although such a counter is effective for providing a suitable readout of the weight of the object on the pan 16, it has been found that frequently there are transient conditions wherein the needle 20 oscillates over a wide range. When this happens, the intervals between the occurrence of the zero or reference pulses and the occurrence of the indicator or weight pulses will vary. As a consequence, the signals sent to the readout means 196 will be continuously varying until the transients have subsided.

In order to eliminate any misleading or erroneous reading resulting from such transients, suitable means may be provided to disable the readout means during transients. In the present instance, the disabling means includes an AND gate 226 and a bistable relay 228. The AND gate 226 is of a conventional design having four separate inputs 230, 232, 234 and 236 that are arranged so that a signal will be provided at the output 238 only when signals are present on all of the inputs 230 and 236 at the same time. These inputs are connected to the output 152 of the relay 148, the zero output of the matrix 222, the eighth output of matrix 220 and the seventh output from the matrix 218. It may thus be seen that all of the inputs 230 to 236, inclusive, will have signals thereon only when the counters 132, 134 and 136 as well as relay 148 have counted a number of pulses equal to the number of graduations 80 on the disc 46. As will become apparent, it is desirable for the input 236 to be connected to the sixth, seventh and eighth outputs of the matrix 218 by means of an OR gate 238. Thus, the AND gate 236 will be opened if the number of pulses counted by the counter 130 differs by one or less from the total number of graduations 80.

The relay 228 is of the bistable variety having a pair of inputs 240 and 242 and a pair of outputs 244 and 246. These are arranged so that a signal on the input 240 will remove the signal from the output 246 but put a signal on the output 244. Conversely, a signal on the input 242 will remove the signal from the output 244 and put a signal on output 246.

The input 240 is connected to the output from the AND gate 226 while the output 244 is connected to the inputs 210 of the gates 198, 200 and 202. Thus, a signal from the AND gate 226 will switch the relay 228 to a condition so that the gates 198 to 202 may open. The output 244 is also connected to the input 260 so as to open gate 158 at the same time.

The input 242 is connected to the output of one of the gates 198 to 202 whereby said relay 228 will switch each time a signal is fed to the readout means. The output 246 is connected to the input 184 so as to permit gate 178 to open.

In order to employ the present means 8 for determining the weight of an object, the motor 38 may be started and the object placed on the weight pan 16. This will be effective to cause the shaft 36 and the discs 40 and 46 to be rotatably driven at some predetermined speed. The graduations 80 will be moving past the pickup head 86 so as to cause a series of pulse trains containing the counting pulses. The number of counting pulses in each train will be equal to the number of graduations 80 on the disc 46 and will normally be so large as to exceed the capacity of the counter. By way of example, as suggested before the graduations may be on the order of about 1087.

The counting pulses will be transmitted over the leads 92 to the first input 110 of the computer 11. The counting pulses in the successive pulse trains will first pass through the amplifier 118 and be amplified. The pulses will then be fed to the input 120 of the AND gate 122 where they will be blocked or passed depending upon whether AND gate 122 is closed or open. Each time the magnet 100 moves past the pickup head 94, it will produce a reference or zero pulse. These pulses will flow over conductors 99 to the second input 112 of the computer 11 where they will be blocked or passed by the AND gate 158 depending upon whether or not the AND gate 158 is closed or open. The weight or indicator head 50 will then move past the magnet 58 and produce the weight pulse on the conductors 76. The intervals between the zero pulses at the input 112 and the weight pulses at the input 114 are a function of the deflection of the needle 20 and, therefore, of the weight of the object. The weight pulses will flow over the conductors 76 to the inputs 176 and 180 of the AND gate 178 and the inhibit gate 182 will thus be fed to the high input 164 or the low input 168 of the relay 166 depending upon which of the gates 178 and 182 is open.

Assume first that the relays 166 and 228 are set so that there will be no signals on the outputs 170 and 244 but there will be signals on the outputs 172 and 246. This will be effective to maintain the gate 122 and the gate 158 closed. The counting pulses and the zero or reference pulses will thus be blocked from passing through the gates 122 and 158. However, the signals from the outputs 172 and 246 of the relay 166 and the relay 228 will bias the gate 178 open.

When the next weight or indicator pulse occurs at input 114, the pulse will be fed from the output 188 of the AND gate 178 to the input 190 of the inhibit gate 182. This will be effective to block the passage of the weight or indicator pulse to the input 188 of the relay 166. However, the pulse from the output 188 of the AND gate 178 will also be fed directly to the input 164 of the relay 166. This will be effective to switch the relay 166 so that a signal will be present on the output 170. This, in turn, will be effective to close the AND gate 178, open the inhibit gate 182 and open the AND gate 122.

As a consequence, the counting pulses will now be free to flow through the AND gate 122 and monostable relay 128 to the input of the counter 130. The counters 132 to 136, inclusive, will then commence to accumulate a count of the counting pulses. When the next weight or indicator pulse occurs, the AND gate 178 will be effective to prevent the pulse reaching the input 164 to the relay 166. However, the pulse will be free to pass through the inhibit gate 182 to the input 168 of the relay 166. This will cause the relay 166 to switch to the state where the signal will be removed from the input 124 to the gate 122. The counting pulses will now be blocked from entering the decade counters 132 to 136. The counters 132 to 136 will thus have accumulated a count of the number of weight pulses that have occurred since the last weight signal. It should be noted that the relay 228 will have maintained the gate 158 closed whereby the zero or reference pulses will be unable to switch the relay 166.

In the event the needle 20 has moved during the interval between the weight pulses, the pickup head 82 will have scanned more or less than 360° of the periphery between the successive weight or indicator pulses. The number of pulses counted by the counter 130 will differ from the number of graduations 80 on the disc 46. In the event the number of pulses counted differs from the total number of graduations 80 on the periphery of the disc 46, one or more of the conditions represented by inputs 230 to 236 of AND gate 226 will not be satisfied. The AND gate 226 will remain closed. This, in turn, will insure the bistable relay 228 remaining in the state where there is a signal on the output 246 so that the AND gates 198, 200 and 202 will be closed. As a consequence, a count will not be transferred to the display panel. Since the bistable relays 228 and 166 have signals on the outputs 246 and 172, the AND gate 178 will be open and the inhibit gate 182 will be closed. Thus, the next weight or indicator pulse will cause a re-scanning of all of the graduations 80 as described above.

However, if the indicator needle 20 is in the same position when both of the weight pulses occurred, the pickup head 82 will have scanned exactly 360° of the periphery of the disc 46 and the count accumulated in the decade counters 132, 134 and 136 and the relay 148 will be equal to the total number of graduations 80 present on the periphery of the disc 46. As a consequence, only when the needle 20 has come to rest and all of the transient conditions disappeared will the number of pulses accumulated in the counter be precisely equal to the number of graduations on the disc 46. This, in turn, will mean that all of the conditions represented by the inputs 230 to 236 will be satisfied.

More particularly, in the example where there are 1087 graduations 80, the relay 148 will have been switched so that a signal will be present on the input 230 to the AND gate 226. Also, a signal will be present on the zero output of the matrix 222, the eighth output of the matrix 220 and on the seventh output of the matrix 218. As a consequence, signals will be present on all of the inputs to the AND gate. It should be noted that under some circumstances, although the needle 20 is stationary, it may be positioned so that the count accumulated in the counter will differ by 1 from the total number of graduations, i.e. 1087. Accordingly, the sixth, seventh and eighth outputs of the matrix 218 may be connected to the OR gate 238. This will insure the input 236 to the gate 226 receiving a signal even though the accumulated count is in error by 1.

When the needle 20 is stationary, all of the conditions represented by the inputs 230 to 236 and the AND gate 226 will open and switch the relay 228. When relay 228 switches, it will be effective to remove the signal from output 246 and put a signal on output 244. This will open the AND gates 198, 200 and 202 and the inhibit gate 182 and close the AND gate 178. When the next zero or reference pulse occurs at the input 112, the pulse will be fed through the gate 158 to the input 164 of the bistable relay 166. This will result in the AND gate 122 opening and permitting the counting pulses to begin flowing into the counter 130 whereby the counters 132, 134, and 136 will commence accumulating a count thereof. This counting will continue until the next weight or indicator pulse occurs. When such a pulse occurs, it will flow through the inhibit gate 182 to the bistable relay 166 so as to switch it to its low position. This, in turn, will remove the signal from the input 124 to the AND gate 122 whereby the gate 122 will close and prevent any further counting pulses being transferred to the decade counters 132, 134 and 136 and/or the matrices 218, 220 and 222. Since only the pulses between the zero pulse and the weight pulse are counted, the magnitude of the count accumulated in the decade counters 132 to 136 will be transferred to the display panel 196. After this transfer has been completed, a pulse will emerge from the delay line 194 so as to clear the decade counters 132, 134 and 136 and relay 148 for a subsequent count.

At the time the count is transferred to the display panel 196, a signal from the output of the AND gate 202 will be fed back to the input 242 of the bistable relay 228 so as to switch this relay 228 to the low condition. When this happens, a signal will be removed from the input 160 of the AND gate 158 so as to close it and a signal will be applied to the input 184 of the AND gate 186 whereby the gate 178 may open it and close the inhibit gate 182. Thus, upon the occurrence of the next weight or indicator pulse, all of the graduations 80 will be scanned while the disc 46 makes one complete revolution. In the event the needle 20 has moved since the last reading, the scanning operation will be repeated until it stabilizes. However, if the needle 20 is still in the same position, the AND gate 158 will be switched open and the AND gate 178 will be switched closed so that the counting pulses may be counted to accumulate a count proportional to the weight of the object.

If there is a zero weight on the pan 16, the zero or reference pulse will be coincident with the indicator or weight pulse. Relay 166 is set so that if these pulses are applied simultaneously to the inputs 164 and 168, the relay 166 will have a signal on the output 172 only. This will cause gate 122 to remain closed and permit pulses to reach the counter 130. This in turn will cause the display panel 196 to produce a zero reading and thereby provide a check on the operation of the system.

Although only a single embodiment of the present invention has been disclosed and described herein, it will be readily apparent to persons skilled in the art that numerous changes and modifications may be made without departing from the spirit of the invention. Accordingly, the foregoing disclosure and description thereof are for illustrative purposes only and do not in any way limit the invention which is defined only by the claims which follow.

What is claimed is:

1. Means for indicating the weight of an object, including the combination of:
    means for generating a series of signals representing increments in the weight of the object,
    scale means having an indicator movable in proportion to the weight of the object,
    pickup means disposed on said generating means relative to said indicator for indicating when said indicator is contiguous to said pickup means, and
    means electrically interconnected with said pickup means and said generating means and responsive to the number of said signals occurring during an interval until the indication by the pickup means for indicating the weight of said object.

2. Means for indicating the weight of an object, including the combination of:
    scale means having an indicator movable in proportion to the weight of the object,
    pickup means responsive to the position of said indicator,
    means operatively interconnected with said pickup means and effective to provide signals having characteristics indicating the displacement of said indicator,
    readout means operatively interconnected with said last mentioned means and responsive to said signals to indicate the weight of said object, and
    means responsive to movement of said indicator and effective to prevent said readout means from indicating the weight of said object when said indicator is moving.

3. Means for indicating the weight of an object, including the combination of:
    means for generating a series of signals representing increments in the weight of the object,
    scale means having an indicator movable in proportion to the weight of the object,
    pickup means disposed on said generating means and responsive to the position of said indicator,
    means operatively interconnected with said pickup means and with said generating means for obtaining the generation of number of said signals during an interval that is proportional to the displacement of said indicator,
    means operatively interconnected with said last means and responsive to said number of signals to indicate the weight of said object, and
    means responsive to the motion of said indicator to prevent said last means from indicating the weight of said object when said indicator is moving.

4. Means for indicating the weight of an object, including the combination of:
    means for generating a series of signals representing increments in the weight of the object,
    scale means having an indicator movable in proportion to the weight of the object,
    pickup means disposed on said generating means relative to said indicator for indicating the position of said indicator,
    counting means operatively interconnected with said pickup means and with said generating means for counting the number of signals during an interval proportional to the displacement of said indicator,
    readout means responsive to the number of signals counted by said last means to indicate the weight of said object, and
    gating means interconnecting said readout means with said counting means, said gating means being responsive to the motion of said indicator to permit said readout means to indicate the weight of said object only when said indicator is stationary.

5. Means for indicating the weight of an object, including the combination of:
    means for generating a series of signal repersenting increments in the weight of the object,
    scale means having an indicator movable through an arc proportional to the weight of the object,
    pickup means responsive to the position of said indicator member to produce a reference timing signal and a weight timing signal, said reference and weight timing signals being separated from each other by a variable interval of time proportional to the weight of said object, readout means operatively interconnected with said pickup means and with said generating means and responsive to the number of signals occurring during said interval between said reference and weight timing signals, for indicating the weight of said object, and gating means responsive to the movement of said indicator to prevent said readout means from indicating the weight of said object when said indicator member is moving.

6. Means for indicating the weight of an object, including the combination of:

scale means having an indicator movable in proportion to the weight of the object, pickup means responsive to the position of said indicator, means operatively interconnected with said pickup means to provide signals proportional having charactertics dependent upon to the displacement of said indicator, readout means responsive to said signal to indicate the weight of said object, and gating means operatively interconnecting said readout means with the preceding means to prevent said readout means from indicating the weight of said object when said indicator member is moving.

7. Means for indicating the weight of an object, including the combination of:

means for generating a series of signals representing increments in the weight of the object, scale means having an indicator movable through an arc proportional to the weight of the object, pickup means responsive to the position of said indicator to produce a reference timing signal and a weight timing signal, said reference and weight timing signals being separated form each other by a variable interval of time proportional to the weight of said object, readout means operatively interconnected with said pickup means and with said generating means for indicating the weight of said object, and gating means operatively interconnecting said readout means with the preceding means, said gating means being responsive to movement of said indicator and effective to prevent said readout means from indicating the weight of said object whenever said indicator is moving.

8. Means for indicating the weight of an object, including the combination of:

means for generating a series of signals representing increments in the weight of the object, scale means having an indicator movable through an arc proportional to the weight of the object, pickup means responsive to the position of said indicator to produce a reference timing signal and a weight timing signal, said reference and weight timing signals being separated from each other by a variable interval of time proportional to the weight of said object, readout means operatively interconnected with said pickup means and with said generating means for indicating the weight of said object, and gating means operatively interconnecting said readout means with the preceding means, said gating means being effective to prevent said readout means from indicating said weight except when the number of pulses between successive timing pulses is constant.

9. Means for indicating the weight of an object, including the combination of:

a first member mounted to rotate about its axis, a second member disposed adjacent said first member, there being a series of graduations circumferentially spaced around one of said members at intervals representing increments of the weight of said object, pickup means on the other of said members and disposed adjacent said one member for scanning said graduations as they move therepast to provide a series of counting signals, an indicator disposed adjacent said rotating member and movable about said axis and through an arc proportional to the weight of the object, reference pickup means responsive to the angular position of said first member to provide a reference timing signal each time said first member passes through a predetermined angular position, weight pickup means responsive to the position of said indicator to provide a weight timing signal each time the first member rotates through an angular position proportional to the angular displacement of said indicator, counting means effective to count the number of said counting signals between said reference timing signal and said weight timing signal, means interconnecting said counting means with said first pickup means during the interval between said reference and weight timing signals so that said counting means will be effective to count the number of counting signals occurring during said interval, and readout means interconnected with said counting means and responsive to the number of said counting signals counted by said counting means to indicate the weight of said object.

10. Means for indicating the weight of an object, including the combination of:

a first member mounted to rotate about its axis, a second member disposed adjacent said first member, there being a series of graduations circumferentially spaced around one of said members at intervals representing increments of the weight of said object, pickup means on the other of said members and disposed adjacent said member for scanning said graduations as they move therepast to provide a series of counting signals, an indicator disposed adjacent said rotating member and movable about said axis and through an arc proportional to the weight of the object, reference pickup means responsive to the angular position of said first member to provide a reference timing signal each time said first member passes through a predetermined angular position, weight pickup means responsive to the position of said indicator member to provide a weight timing signal each time the first member rotates through an angular position proportional to the angular displacement of said indicator, counting means effective to count the number of said counting signals between said reference timing signal and said weight timing signal, means interconnecting said counting means with said first pickup means during the interval between said reference and weight timing signals so that said counting means will be effective to count the number of counting signals occurring during said interval, readout means responsive to the number of said counting signals counted by said counting means to indicate the weight of said object, and gating means operatively interconnecting said readout means with said counting means, said gating means being responsive to movement of said indicator to prevent said readout means from indicating said weight except when said indicator is stationary.

11. Means for indicating the weight of an object, including the combination of:

a first member mounted to rotate about its axis, a second member disposed adjacent said first member, there being a series of graduations circumferentially spaced around one of said members at intervals representing increments of the weight of said object, pickup means on the other of said members and disposed adjacent said member for scanning said graduations as they move therepast to provide a series of counting signals, an indicator disposed adjacent said rotating member and movable about said axis and through an arc proportional to the weight of the object, reference pickup means responsive to the angular position of said first member to provide a reference timing signal each time said first member passes through a predetermined angular position, weight pickup means responsive to the position of said indicator member to provide a weight timing signal each time the first member rotates through an angular position proportional to the angular displacement of said indicator, counting means effective to count the number of said counting signals between said reference timing and weight timing signals, gate means electrically interconnecting said counting means with said first pickup means for supplying said counting signals to said counting means so that said counting means will be effective to count the number of counting signals, said gate means being responsive to the occurrence of said reference timing signals to open and responsive to the occurrence said weight timing signals to close so that said counting means will count only the counting signals occurring between said reference and weight timing signals, and readout means responsive to the number of said counting signals counted by said counting means to indicate the weight of said object.

12. Means for indicating the weight of an object, including the combination of:

a first member mounted to rotate about its axis, a second member disposed adjacent said first member, there being a series of graduations circumferentially spaced around one of said member at intervals representing increments of the weight of said object, pickup means on the other of said members and disposed adjacent said member for scanning said graduations as they move therepast to provide a series of counting signals, an indicator disposed adjacent said rotating member and movable about said axis and through an arc proportional to the weight of the object, reference pickup means responsive to the angular position of said first member to provide a reference timing signal each time said first member passes through a predetermined angular position, weight pickup means responsive to the position of said indicator member to provide a weight timing signal each time the first member rotates through an angular position proportional to the angular displacement of said indicator, counting means effective to count the number of said counting signals between said reference timing signals and weight timing signals, first gate means electrically interconnecting said counting means with said first pickup means for supplying said counting signals to said counting means so that said counting means will be effective to count the number of counting signals, said gate means being responsive to the occurrence of said reference timing signals to open and responsive to the occurrence of said weight timing signals to close so that said counting means will count only the counting signals occurring between said timing signals, readout means responsive to the number of said counting signals counted by said counting means to indicate the weight of said object, and second gate means electrically interconnecting said readout means with said counting means, said second gating means being responsive to movement of said indicator to connect said readout means to said counting means only when said indicator is stationary.

13. Means for indicating the weight of an object, including the combination of:

a first member mounted to rotate about its axis, a second member disposed adjacent said first member, there being a series of graduations circumferentially spaced around one of said members at intervals representing increments of the weight of said object, pickup means on the other of said members and disposed adjacent said member for scanning said graduations as they move therepast to provide a series of counting signals, an indicator disposed adjacent said rotating member and movable about said axis and through an arc proportional to the weight of the object, reference pickup means responsive to the angular position of said first member to provide a reference timing signal each time said first member passes through a predetermined angular position, weight pickup means responsive to the position of said indicator member to provide a weight timing signal each time the first member rotates through an angular position proportional to the angular displacement of said indicator, counting means effective to count the number of said counting signals between said reference timing signals and weight timing signals, means interconnecting said counting means with said first pickup means during the interval between said reference timing and weight timing signals so that said counting means will be effective to count the number of counting signals occurring during said interval, means electrically interconnecting said counting means with said first pickup means during the interval between successive weight timing signals so that said counting means will be effective to count the number of counting signals between said weight signals, readout means responsive to the number of said counting signals counted by said counting means to indicate the weight of said object when the number of timing signals corresponds to the number of graduations on said one of said first and second members, and gating means operatively interconnecting said readout means with said counting means, said gating means being effective to isolate said readout means from said counting means when the number of counting signals between successive weight pulses is not constant.

14. Means for indicating the weight of an object, said means including the combination of:

a member mounted to rotate about its axis, a group of graduations circumferentially spaced around said member to represent increments in the weight of the object, pickup means positioned to scan said graduations as they move therepast to provide a series of counting signals, an indicator movable in proportion to the weight of the object, pickup means responsive to the angular position of said member to provide a weight timing pulse each time that said member moves through an angular position proportional to the angular displacement of said indicator, pickup means responsive to the angular position of said member to produce a reference timing signal each time said member passes through a predetermined reference position, counting means effective to count said signals in said series, gating means interconnecting said counting means with said first pickup means between a pair of successive weight timing signals to count the number of said counting pulses, said gating means being effective to then connect said counting means with said first pickup means for an interval equal to the time between a reference time signal and weight timing signals for counting said counting signals only when said counter counts a total number of signals substantially equal to the number of graduations in said group.

15. Means for providing a series of signals having a number of signals representing the weight of an object, said means including the combination of:
an indicator movable in proportion to the weight of the object,
a member rotatably mounted adjacent said first member,
a series of graduations circumferentially spaced around said rotating member at intervals representing increments in the weight of the object,
pickup means disposed adjacent said member for scanning said graduations as they move therepast to provide a series of counting signals, and
pickup means carried by said rotating member and responsive to the position of said indicator to provide a timing signal, said last pickup means being positioned to produce a timing signal each time the member rotates through an angular position proportional to the angular displacement of said indicator, said timing pulse being effective to indicate the occurrence of one end of said series.

16. Means for providing a series of signals having a number of signals representing the weight of an object, said means including the combination of:
an indicator movable through an arc proportional to the weight of the object,
a magnetic member on said indicator to be carried with said indicator,
a member disposed adjacent said indicator for rotating in a plane substantially parallel to the arc through which the indicator swings,
pickup means carried by said rotating member to move past said magnetic member each time said member rotates through one revolution, said pickup means being responsive to the passage of said magnetic member to produce a timing signal when the member rotates through an angular position proportional to the angular displacement of said indicator,
a series of graduations circumferentially spaced around said rotating member at intervals representing increments in the weight of the object, and
pickup means disposed adjacent said rotating member for scanning said graduations as they move therepast to provide a series of counting signals,
said timing signal being effective to indicate the occurrence of one end of said series of signals.

17. Means for providing a series of signals having a number of signals representing the weight of an object, said means including the combination of:
scale means having an indicator movable through an arc proportional to the weight of the object,
a member rotatably mounted adjacent said scale means to continuously rotate past said indicator member,
a series of magnetic graduations circumferentially spaced around said rotating member at intervals representing increments in the weight of the object,
magnetic pickup means disposed adjacent said rotating member for scanning said graduations as they move therepast to provide a series of counting pulses, and
pickup means carried by said rotating member and responsive to the position of said indicator member to provide a timing signal each time that the member rotates through an angular position proportional to the angular displacement of said indicator, said timing signal being effective to indicate the occurrence of one end of said pulse train.

18. Means for providing a series of signals having a number of signals representing the weight of an object, said means including the combination of:
scale means having a receptacle for receiving the object to be weighed and having a first member rotatable about an axis through an arc proportional to the weight of the object on said receptacle,
a second member rotatably mounted adjacent said first member,
a series of graduations circumferentially spaced around said second member to represent increments in the weight of the object,
pickup means disposed adjacent said rotating member for scanning said graduations as they move therepast to provide a series of counting signals,
pickup means carried by said rotating member and responsive to the position of said first member to provide a first timing signal each time that the second member moves through an angular position proportional to the angular displacement of said first member,
pickup means responsive to the angular position of said rotating member to produce a second timing signal each time said first member passes through a predetermined reference position,
one of said timing signals being effective to indicate the commencement of said series of signals and the other of said timing signals being effective to indicate the termination of said series.

19. Numerical indicating means for providing a pulse train having a number of pulses representing the weight of an object, said numerical indicating means including the combination of:
scale means having a receptacle for receiving the object to be weighed,
a first member interconnected with said receptacle and rotatable about an axis through an arc proportional to the weight of the object on said receptacle,
a second member rotatably mounted adjacent said first member,
means for rotatably driving said second member in a plane substantially parallel to the arc through which the first member swings,
a series of magnetic graduations spaced circumferentially around said second member at intervals that represent increments in the weight of the object,
magnetic pickup means disposed adjacent said rotating member for scanning said graduations as they move therepast to provide a series of counting pulses,
pickup means carried by said rotating member and responsive to said first member to provide a first timing pulse each time that the second member moves through an angular position proportional to the angular displacement of said first member,
a pickup responsive to the angular position of said rotating member to produce a second timing pulse each time said first member passes through a predetermined reference position,
one of said timing pulses being effective to indicate the commencement of said pulse train and the other of said timing pulses being effective to indicate the termination of the pulse train.

20. Numerical indicating means for providing a pulse train having a number of pulses representing the weight of an object, said numerical indicating means including the combination of:
scale means having a receptacle for receiving the object to be weighed,
a first member interconnected with said receptacle and rotatable about said axis through an arc proportional to the weight of the object on said receptacle,
a magnetic member on said first member movable therewith through said arc,
a second member rotatably mounted adjacent said first member,
means for continuously rotating said second member in a plane substantially parallel to the arc through which the first member swings, a series of graduations circumferentially spaced around said second member to represent increments in the weight of the object, pick-up means disposed adjacent said rotating member for scanning said graduations as they move therepast to provide a series of counting pulses, a magnetic pick-up carried by said second member and responsive to the movement of said magnetic member to provide a first timing pulse each time that the second member moves through an angular position proportional to the angular displacement of said first member, a magnetic member carried by said rotating member, a pick-up responsive to the passage of said second magnetic member to produce a second timing pulse each time said first member passes through a predetermined reference position, one of said timing pulses being effective to indicate the commencement of said pulse train and the other of said timing pulses being effective to indicate the termination of the pulse train.

21. Numerical indicating means for providing a pulse train having a number of pulses representing the weight of an object, said numerical indicating means including the combination of:

scale means having an indicator member movable through an arc proportional to the weight of the object, a magnetic member disposed on said indicator member and movable therewith through said arc, a second member mounted adjacent said first member for being rotated in a plane, means for continuously rotating said second member in said first plane, a series of magnetic members disposed on said second member, said magnetic members being circumferentially spaced around said rotating member at intervals representing increments in the weight of the object, an inductance disposed adjacent said second member and positioned so that the magnetic members in said series will move past said inductance and provide a series of counting pulses, inductive means carried by said rotating member and responsive to the presence of said first magnetic member, said last inductive means being effective to provide a timing pulse each time said second member rotates through an angular position proportional to the angular displacement of said indicator member, said timing pulse being effective to indicate the occurrence of one end of said pulse train.

22. Numerical indicating means for providing a series of pulse trains with the number of pulses in each train being proportional to the weight of the object, said indicating means comprising the combination of:

scale means having a receptacle for receiving the object to be weighed and an indicator member for being deflected through an arc having a length proportional to the weight of the object, a second member disposed adjacent said indicator member for being rotatably driven relative to said indicator member, a transformer having a primary winding and a secondary winding that are inductively coupled together, said primary winding being operatively interconnected with said second member to rotate therewith, said secondary winding being disposed in a fixed position, a series of graduations circumferentially disposed around said rotating member and being spaced to represent increments of the weight of said object, a second pick-up disposed adjacent said rotating member to scan said graduations and produce a counting pulse each time one of said graduations moves past said pick-up means, a pick-up carried by said rotating member to rotate past said indicator member, said pick-up being responsive to the presence of said indicator member to provide a timing pulse each time said second member rotates through an angular position proportional to the angular deflection of said indicator member, said pick-up means being interconnected with said primary winding so that said timing pulse will be coupled into said secondary winding, one of said timing pulses being effective to indicate the commencement of said pulse train and the other of said timing pulses being effective to indicate the termination of said pulse train.

23. Numerical indicating means for providing a series of pulse trains with the number of pulses in each train being proportional to the weight of the object, said indicating means comprising the combination of:

scale means having a receptacle for receiving the object to be weighed and an indicator member for being deflected through an arc having a length proportional to the weight of the object, a second member disposed adjacent said indicator member for being rotatably driven relative to said indicator member, a transformer having a primary winding and a secondary winding that are inductively coupled together said primary winding being operatively interconnected with said second member to rotate therewith, said secondary winding being disposed in a fixed position, a series of graduations circumferentially disposed around said rotating member and being spaced to represent increments of the weight of said object, first pick-up means disposed adjacent said rotating member to scan said graduations and produce a counting pulse each time one of said graduations passes said pick-up means, second pick-up means carried by said rotating member to rotate past said indicator member, said pick-up being responsive to the presence of said indicator member to provide a timing pulse each time said second member rotates through an angular position proportional to the angular deflection of said indicator member, said pick-up means being interconnected with said primary winding so that said timing pulse will be coupled into said secondary winding, third pick-up means disposed adjacent said rotating member to provide a second timing pulse each time that said rotating member passes through a predetermined fixed reference position, one of said timing pulses being effective to indicate the commencement of said pulse train and the other of said timing pulses being effective to indicate the termination of said pulse train.

24. Numerical indicating means for providing a series of pulse trains with the number of pulses in each train being proportional to the weight of the object, said indicating means comprising the combination of:

scale means having a receptacle for receiving the object to be weighed, an indicator member interconnected with said receptacle for being deflected through an arc having a length proportional to the weight of the object, a magnetic member carried by said indicator member for being carried through said arc, a second member disposed adjacent said indicator member, means for continuously rotatably driving said second member relative to said indicator member, a transformer having a primary winding and a secondary winding, said primary winding being operatively interconnected with said second member to rotate therewith, said secondary winding being disposed in a fixed position and inductively coupled to said primary winding, magnetic pick-up means carried by said rotating member to rotate past said magnetic member, said pick-up means being responsive to the passage of said magnetic member to provide a timing pulse each time said second member rotates through an angular position proportional to the angular deflection of said indicator member, means interconnecting said pick-up means with said primary winding so that said timing pulse will be coupled into said secondary winding, a series of magnetic graduations circumferentially disposed around said rotating member and being spaced to represent increments of the weight of said object, second magnetic pick-up means disposed adjacent said rotating member to scan said graduations and produce a counting pulse each time one of said graduations passes said second pick-up means, magnetic means disposed on said rotating member to rotate therewith, third pick-up means disposed adjacent said rotating member and responsive to said last magnetic means moving therepast to provide a second timing pulse each time that said rotating member passes through a predetermined fixed reference position, one of said timing pulses being effective to indicate the commencement of said pulse train and the other of said timing pulses being effective to indicate the termination of said pulse train.

References Cited by the Examiner
UNITED STATES PATENTS

| | | | |
|---|---|---|---|
| 2,803,448 | 8/1957 | Biebel | 177 |
| 2,860,867 | 11/1958 | Allen et al. | 177 |
| 3,039,686 | 6/1962 | Bell et al. | 177 |
| 3,042,128 | 7/1962 | Bell et al. | 177 |
| 3,064,743 | 11/1962 | Marshall et al. | 177—3 |
| 3,108,648 | 10/1963 | Williams | 177 |

LOUIS J. CAPOZI, *Primary Examiner.*

LEO SMILOW, *Examiner.*

STEPHEN J. TOMSKY, *Assistant Examiner.*